(12) United States Patent
Kojima

(10) Patent No.: US 6,619,147 B1
(45) Date of Patent: Sep. 16, 2003

(54) LINEAR ACTUATOR

(75) Inventor: Masakazu Kojima, Tokyo (JP)

(73) Assignee: Wittenstein GmbH & Co. KG, Igersheim (DE)

( * ) Notice: Subject to any disclaimer, the term of this patent is extended or adjusted under 35 U.S.C. 154(b) by 0 days.

(21) Appl. No.: 09/697,254

(22) Filed: Oct. 26, 2000

(30) Foreign Application Priority Data

Oct. 27, 1999 (JP) .......................................... 11-304769

(51) Int. Cl.[7] .............................................. F16H 25/20
(52) U.S. Cl. ...................... 74/89.36; 74/89.33; 74/89.23
(58) Field of Search ............................. 74/89.23, 89.32, 74/89.33, 89.35, 89.36, 89.38

(56) References Cited

U.S. PATENT DOCUMENTS

| | | | | |
|---|---|---|---|---|
| 2,320,953 A | * | 6/1943 | Shenstone ................... | 254/98 |
| 2,459,982 A | * | 1/1949 | Wells ....................... | 74/89.23 |
| 2,562,689 A | * | 7/1951 | Baldwin .................... | 254/98 |
| 2,682,780 A | * | 7/1954 | Pickles ..................... | 74/89.37 |
| 2,769,430 A | * | 11/1956 | Geyer ...................... | 74/89.25 |
| 3,798,983 A | * | 3/1974 | Smith ...................... | 74/89.35 |
| 4,858,481 A | * | 8/1989 | Abraham ................... | 74/89.38 |

* cited by examiner

Primary Examiner—William C Joyce
(74) Attorney, Agent, or Firm—Bachman & LaPointe, P.C.

(57) ABSTRACT

A linear actuator comprises a motor, a rotation-to-linear motion conversion mechanism having a screw and a nut, a support block supporting an end of the screw, and an actuator-side support member with a swing support mechanism (e.g., a swing axis or bearing portion in case of a Trunnion mechanism, or a swing support bearing portion or support leg of the swing support bearing portion). The actuator-side support member is part of the support block or an extension member of the support block or connected therewith. The swing axis of the swing support mechanism is located in the plane including the screw axis, and the force flow line inside the linear actuator is limited on the output shaft, the nut, the screw and the support block.

3 Claims, 6 Drawing Sheets

LINEAR ACTUATOR

BACKGROUND OF THE INVENTION

The invention relates to a linear actuator having a motion conversion mechanism from rotation to linear motion.

Two supporting methods are typically used in currently known linear actuators, such as pneumatic and hydraulic cylinders. One uses a fixed support with one degree of freedom for the output shaft, and the other applies a swing support with two degrees of freedom for the output shaft. There are two types of mechanisms for the latter case, the so-called Trunnion mechanism and the Clevis mechanism. In a pneumatic or hydraulic cylinder, any member of the Trunnion mechanism or Clevis mechanism can fairly easily be equipped on the cylinder parts, such as cylinder end block or cylinder tube. This is since said cylinder parts are designed as force-bearing members.

Recently, linear actuators with electric motors are emerging. The motor rotates a screw, such as a ball screw etc., and a nut engaged with the screw moves linearly, so that consequently an output shaft connected to the nut also moves linearly. In this type of linear actuator, the motor is mainly positioned on a support block supporting the screw in the direction of the screw axis and is located on the other side of the output shaft.

In the current pneumatic or hydraulic cylinders, the Clevis mechanism, which is one of the swing support mechanisms, is used to be positioned on the far end of the cylinder from the output shaft. In case the same way of Clevis mechanism positioning is applied for the linear actuator with an electric motor, the Clevis mechanism should be positioned around the end of the motor. However, the motor is generally not a force-bearing member which should be designed strong enough to be able to support the reaction force to the output shaft from the operated load. Therefore, any member of the Clevis mechanism should be on the side of the motor end. As a matter of fact, linear actuators with electrically powered motor are generally not equipped with the Clevis mechanism. Accordingly, such linear actuators with electrically powered motor are generally also not equipped with the Trunnion mechanism.

Taking into consideration the applications of linear actuators with an electric motor, a swing support mechanism such as Trunnion mechanism or Clevis mechanism is indispensable.

SUMMARY OF THE INVENTION

It is an object of the present invention to provide a technically and also economically reasonable selection way for supporting the linear actuator to be capable of taking a swinging action.

The object is solved by the independent claim. Preferred embodiments are shown by the dependent claims.

According to the invention, a linear actuator comprises:
a motor,
a rotation-to-linear motion conversion mechanism having a screw and a nut,
a support block supporting an end of the screw, and
an actuator-side support member with a swing support mechanism (e.g., a swing axis or bearing portion in case of a Trunnion mechanism, or a swing support bearing portion or support leg of the swing support bearing portion). The actuator-side support member is part of the support block or an extension member of the support block or connected therewith. The swing axis of the swing support mechanism is located in the plane including the screw axis, and the force flow line inside the linear actuator is limited on the output shaft, the nut, the screw and the support block.

The effect of the invention is that in the electrically-powered linear actuator, the screw is used to be supported by a bearing or by bearings in radial or axial direction, so that the screw can rotate keeping the axis stable and does not move in the axial direction due to a reaction force from an operated load applied to the screw through the output shaft and the nut. This means that the support block supporting the screw end is playing a role of a 'waist bone' and represents a force-bearing member on the force flow line.

From this point of view, the members for keeping the function and shape normal, but not the force-bearing members, are the body members covering the mechanism of the screw, the nut, the output shaft, and so on, the members supporting the output shaft in radial direction, the motor cover, the cylinder cover, and so on.

When a swing support mechanism, such as Trunnion mechanism or Clevis mechanism, is used, the actuator-side support member of the swing support mechanism should be supported by a force-bearing member.

Consequently, the construction of the mechanism according to the invention, wherein the swing axis is included in the plane including the screw axis, provides the effect that no bending moment emerges on the screw and correspondingly on the other members than the force-bearing members, when a force is applied on the screw in the direction of the screw axis.

Therefore, the composition according to the invention is the most desirable from the point of view of dynamics.

According to the ideal supporting point selection method in the swing support mechanism (e.g. Trunnion, Clevis, and so on) of the linear actuator, the members required to be force-bearing members play a role for supporting reaction force of the load operation. Thus, a bending moment is not applied to light weight members other than the force-bearing members, and, consequently, an economical machine design with light weight members having the required minimum strength becomes available in the linear actuator being electrically powered and providing capability for small size, light weight and a minimum number of force-bearing members.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
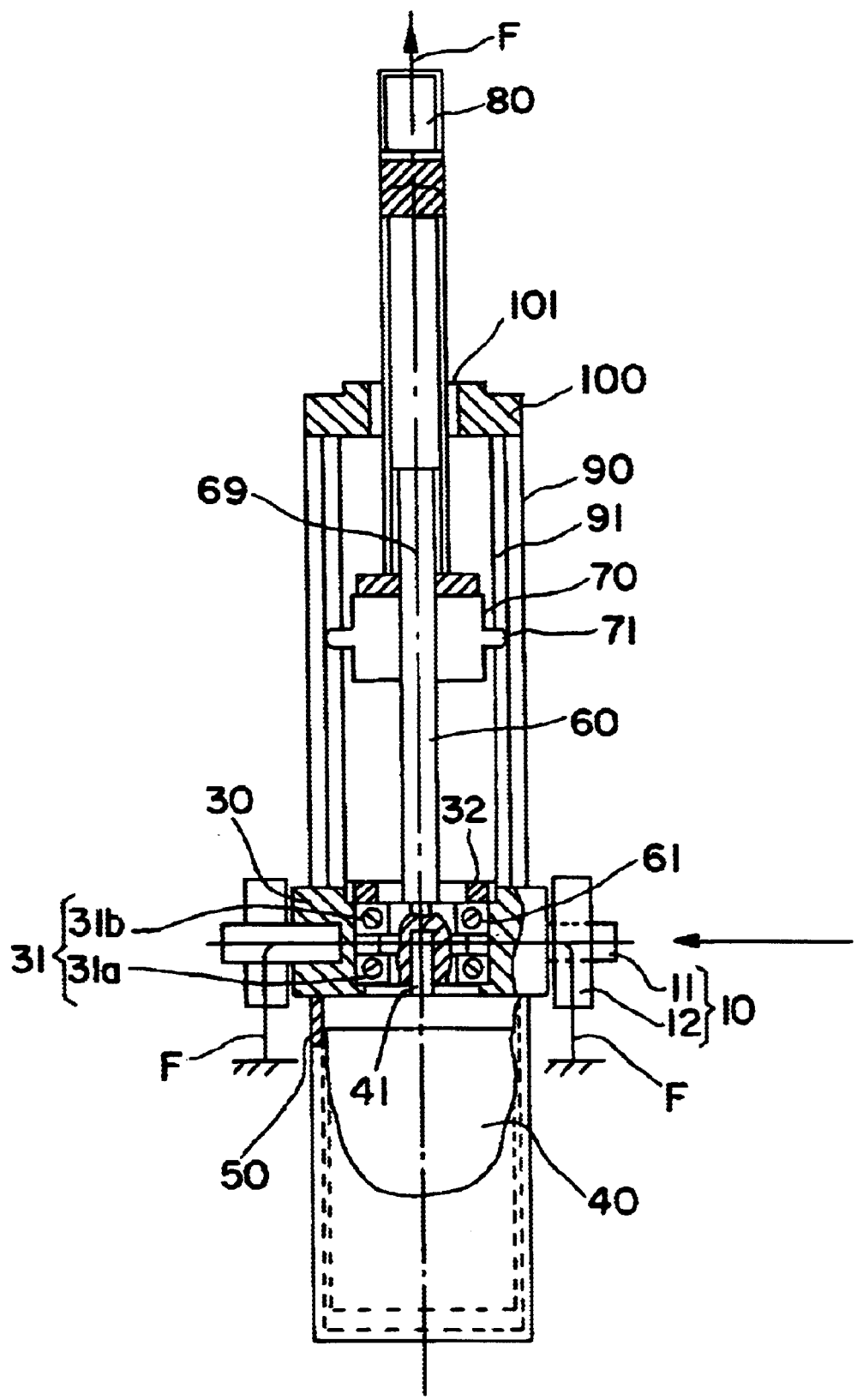
FIG. 1 is an overall and partially cross-sectional view of a linear actuator with a Trunnion mechanism according to this invention.
Figure 2:
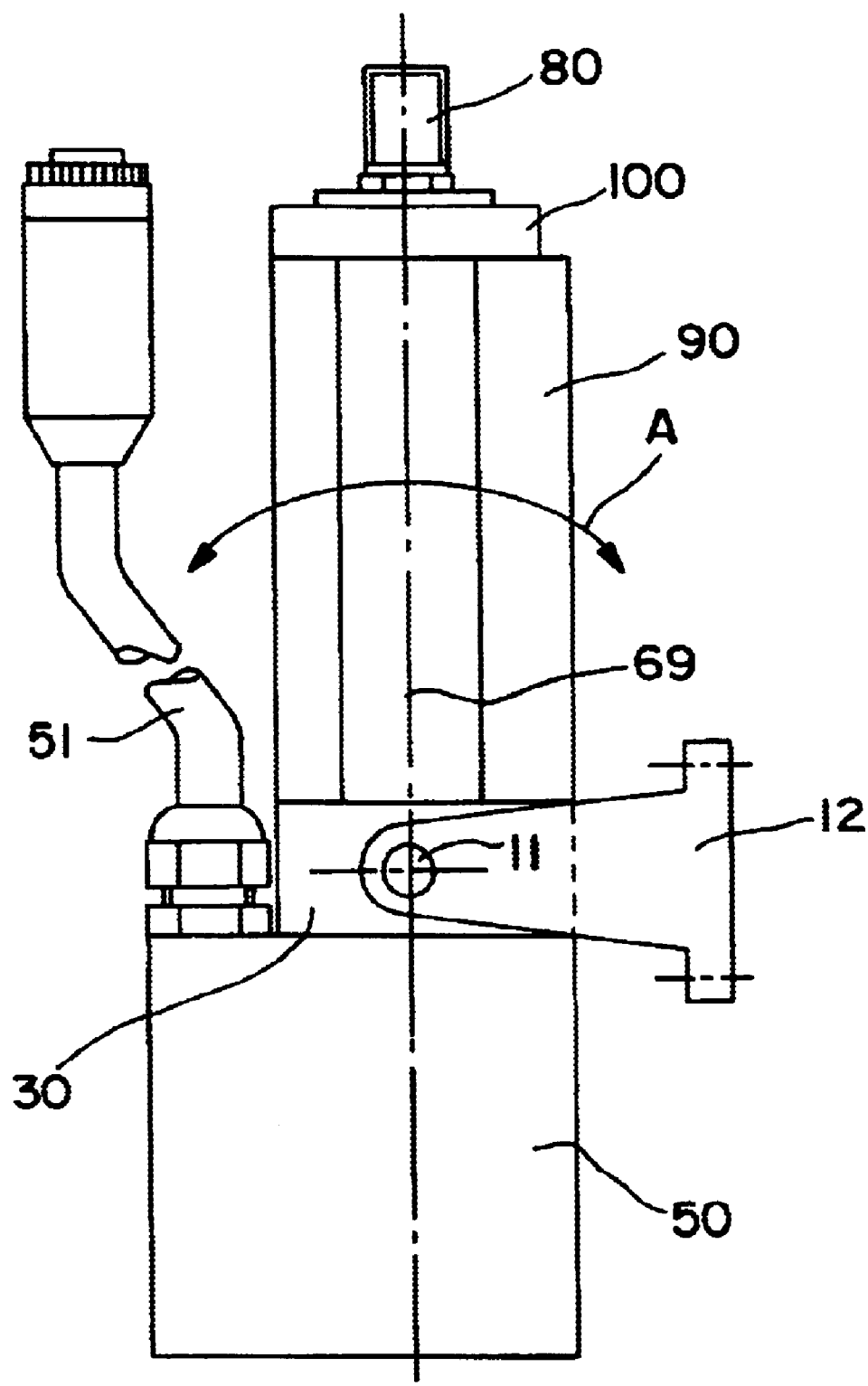
FIG. 2 is a side view of FIG. 1.

FIGS. 1 and 2 show an example of a first embodiment according to the invention of a linear actuator with an electrically-powered motor, supported by a Trunnion mechanism as one of the swing support mechanisms.

A screw 60 is supported by a support block 30, so that the screw 60 does not move into the direction of a screw axis 69, but rotates in the screw axis 69 using two angular bearings 31 (one is 31a and the other one is 31b). The bearings 31 are held in the support block 30, hold a brim portion 61a of an end portion 61 of the screw 60, and are fastened to the support block 30 by a bearing nut 32.

A motor 40 is screw-fastened on the support block 30, whereby a motor axis 41 is inserted into an opening at the end portion 61 of the screw, and is fastened by a set screw which is not described in FIG. 1.

The screw 60 is a so-called ball screw, and a nut 70 is engaged to the screw 60. The nut has two pins 71 engaging with a guide groove 91 which is made on a cylinder cover 90 and is parallel to the screw axis 69. Consequently, the nut 70 moves linearly corresponding to a rotation of the screw 60.

An output shaft 80 is connected to the nut 70 and is guided by a bearing 101 held in an end cup 100.

The motor 40 is covered by a motor cover 50 for keeping out dust and water. An electrical wiring for driving the motor can be brought inside over the motor cover 50.

When a load is operated by the output shaft 80, it can be readily seen that the torque and the force is transferred on the line of the motor 40, the support portion of the screw 60 (the angular bearings 31 and the support block 30), the screw 60, the nut 70, and the output shaft 80. The mechanism members, other than the members on the force transfer line, can thus be provided having only a minimum strength for keeping the function and shape of this actuator as required. Naturally, the members should be designed so as to be of minimum cost and need not be designed as to be used as supporting members of the actuator.

The force flow line inside the actuator for supporting a reaction force onto the load operating force leads from the output shaft 80 to the support portion of the screw 60 through the nut 70 and the screw 60. The support portion finally is provided by the support block 30.

In this embodiment of the present invention, a swing axis 11 of the Trunnion mechanism is provided to satisfy the condition "on the support block 30" and "on the plane including the screw axis 69" as the actuator-side support member. This fulfills the condition that no bending moment, as shown by an arrow A, results from any part of the actuator, when the output shaft 80 operates the load and bears a reaction force. Therefore, this provides the best and ideal way for supporting the actuator in a way that the support block 30 plays the part of the support member of the actuator.

When there is no space for the swing axis 11 on the support block 30, the swing axis may be provided on the extended member of the support block 30 which may be attached to the support block 30. The effect of the supporting is the same as described above.

Figure 3:
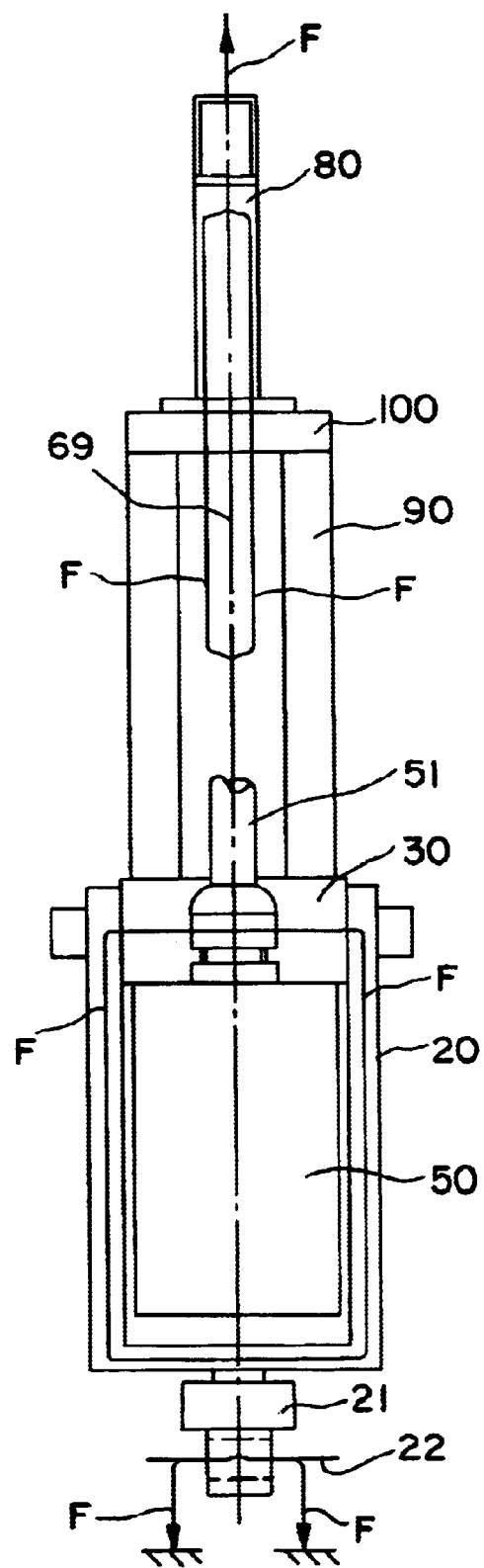
FIG. 3 is an overall view of the linear actuator with Clevis mechanism according to this invention.
Figure 4:
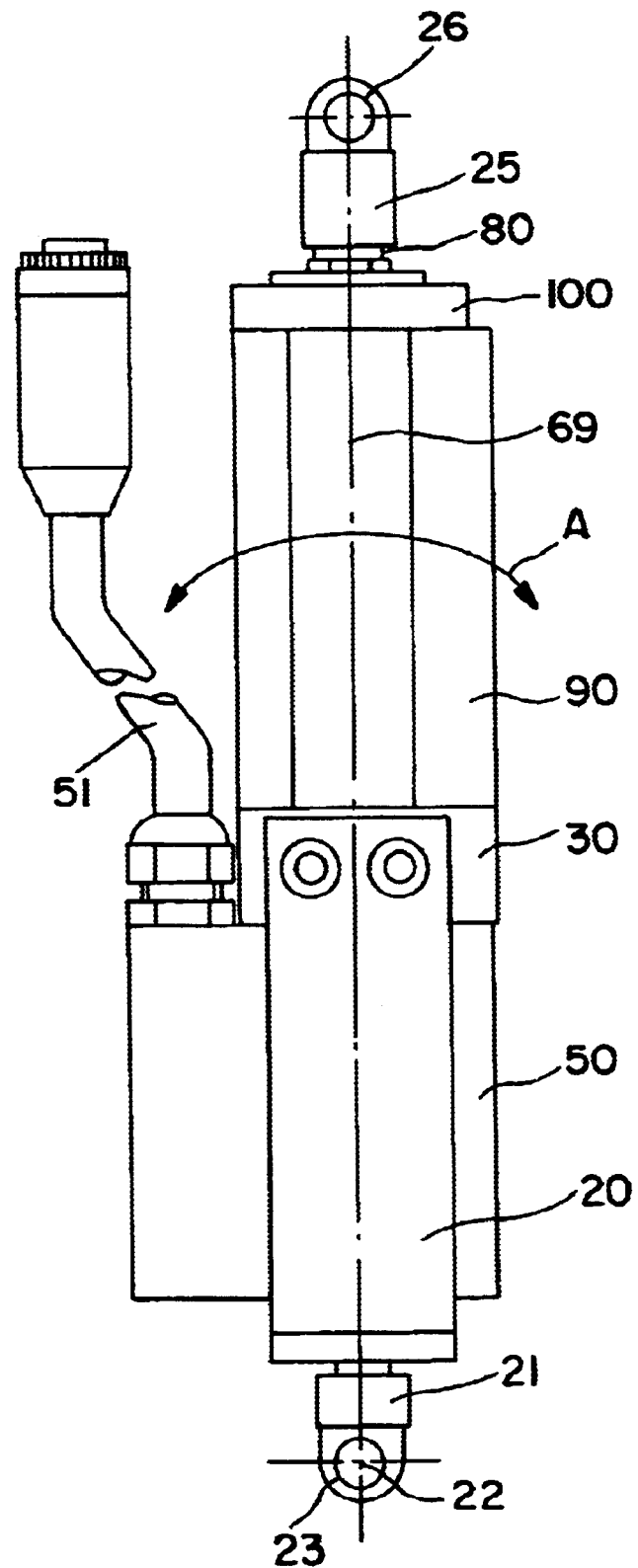
FIG. 4 is a side view of FIG. 3.

FIGS. 3 and 4 show an example of another embodiment of the present invention comprising a linear actuator having an electric motor which is supported by a Clevis mechanism, which is also one of the swing support mechanisms.

An arm member 20 of the Clevis mechanism is provided having a portion 21, wherein a bearing hole 23 with a swing axis 22 is provided. The arm member is playing a role for connecting the portion 21 to the support block 30 and is fastened to the support block by means of screws. Here, the swing axis 22 is provided in the plane including the screw axis 69.

As in the case of the Trunnion mechanism (confer the first embodiment of this invention), no bending moment as shown by the arrow A results at any part of the actuator, when the output shaft 80 operates the load and bears a reaction force. Consequently, this is also an ideal way for supporting the actuator.

In both cases of the first and second embodiments of this invention, the support block 30 is preferably made of steel for the sake of strength. Thick aluminum may also be applied.

The motor cover 50 and the cylinder cover 90 are preferably made of thin aluminum for the sake of light weight. Plastic materials may also be used for the same reason.

FIGS. 3 and 4 show another type of the operating end of the output shaft 80. This type of the output shaft 80 provides more effectiveness together with the supporting method of this invention. An operating end 25 with a bearing hole 26 is provided on the end of the output shaft 80, and the center line of the bearing hole 26 is included in the plane wherein the center line of the bearing hole 23 and the screw axis 69 are included.

In case of this operating end 25, the reaction force from the operated loads to the output shaft 80 is only in the direction of the output shaft axis, even if the operated object (load) is guided by any ways. Therefore, the output shaft 80 could be designed in the thinnest dimension in combination with the supporting method of this invention and this operating end 25.

Figure 5:
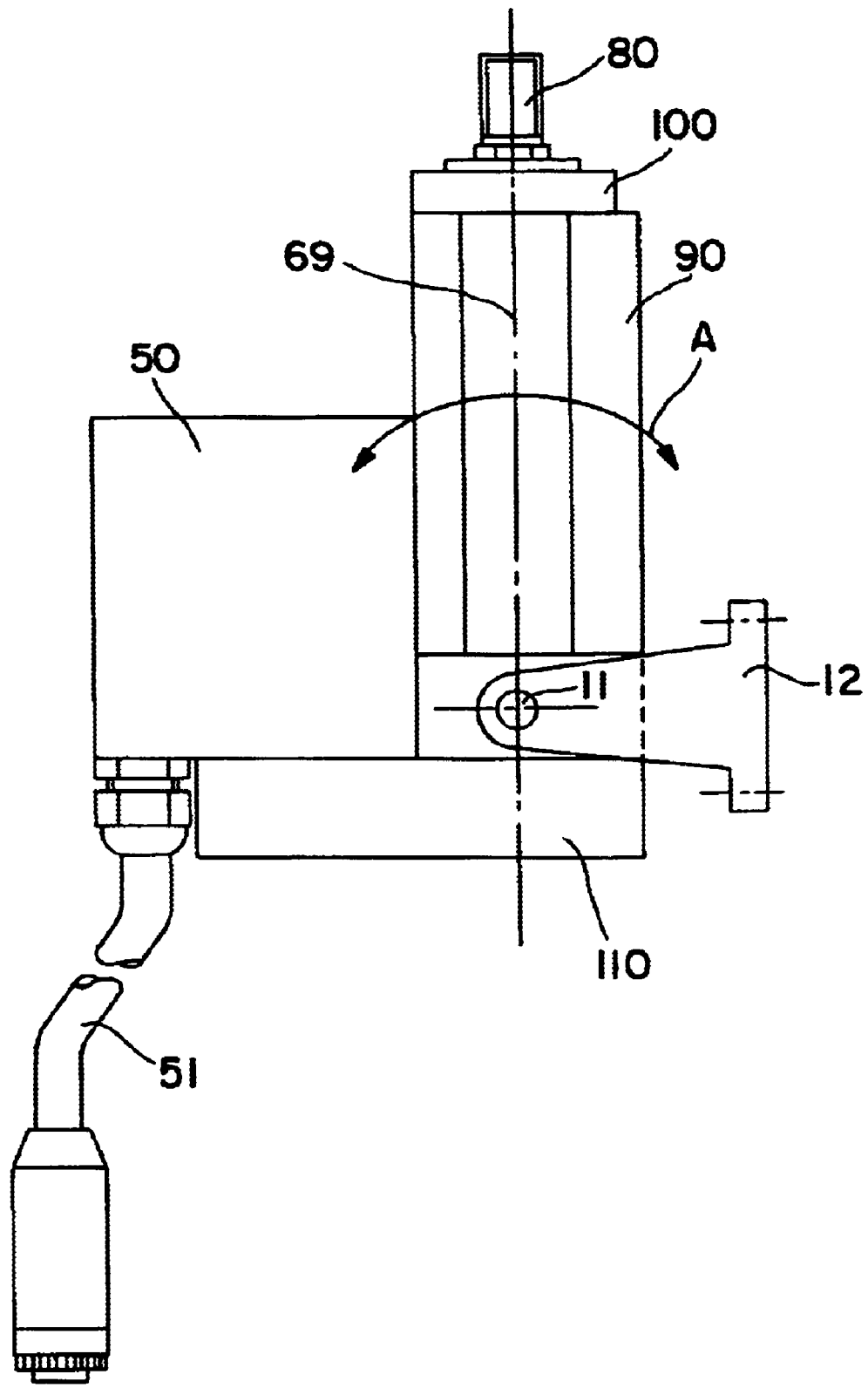
FIG. 5 is an overall view of another type of the linear actuator with Trunnion mechanism according to this invention.
Figure 6:
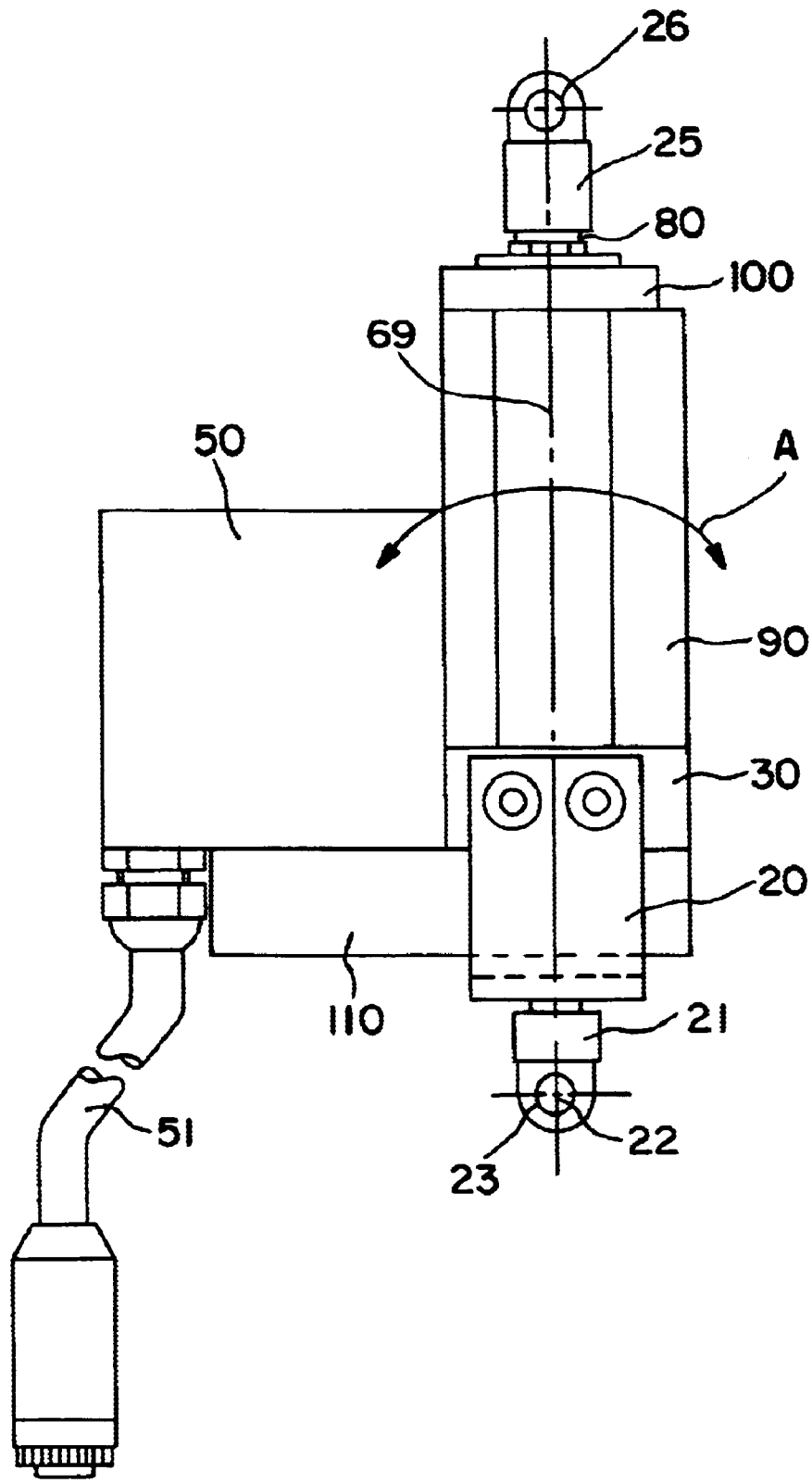
FIG. 6 is an overall view of another type of the linear actuator with Clevis mechanism according to this invention.

FIGS. 5 and 6 show further examples of the combination between the actuator and the supporting method of this invention. In both cases, the motor of the actuator is turned 180 degrees, and the length of the actuator is shortened. The mechanism to connect the motor and the screw is provided by a set of a timing belt and a pulley, and is provided in a connecting block 110. Gear connection may also be provided.

What is claimed is:

1. A linear actuator comprising in line a motion conversion mechanism, a drive mechanism and a support mechanism between the motion conversion mechanism and the drive mechanism; the motion conversion mechanism comprises a driven screw having a screw axis, a nut connected to the driven screw and an output shaft connected to the nut for linear movement; the drive mechanism comprises motor means having an output shaft directly connected to the driven screw at a connection point; and the support mechanism comprises (1) a support block having a pair of bearings secured therein for supporting the driven screw and the output shaft at the connection point and (2) a swing support mechanism connected to the support block wherein the swing support mechanism has a swing axis in a plane intermediate the pair of bearings and including the screw axis whereby force flow line inside the linear actuator is through the output shaft, nut, screw, support block and swing support mechanism while the motor means is substantially free of the force flow.

2. The linear actuator of claim 1, wherein the swing support mechanism is a Trunnion mechanism.

3. The linear actuator of claim 1, wherein the swing support mechanism is a Clevis mechanism.

* * * * *